United States Patent
Plaiseanu et al.

(10) Patent No.: US 11,768,562 B1
(45) Date of Patent: Sep. 26, 2023

(54) AUTOCALIBRATION OF ACOUSTICAL STIMULATION SIGNAL FOR ULTRASONIC TOUCH SENSOR

(71) Applicant: Infineon Technologies AG, Neubiberg (DE)

(72) Inventors: Ana-Maria Plaiseanu, Ploiesti (RO); Costin Batrinu, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/168,373

(22) Filed: Feb. 13, 2023

(51) Int. Cl.
G06F 3/041 (2006.01)
G06F 3/044 (2006.01)
G06F 3/043 (2006.01)

(52) U.S. Cl.
CPC .......... *G06F 3/0418* (2013.01); *G06F 3/0436* (2013.01)

(58) Field of Classification Search
CPC ........ G06F 3/0418; G06F 3/041; G06F 3/044; G06F 3/0436; G01S 15/12; G01S 15/88; A61B 8/485; A61B 8/10; A61B 8/488; A61B 8/5223; A61B 8/5292; A61B 3/165; A61B 2503/40; B06B 1/0207; B06B 1/0292; B06B 1/0644; B06B 2201/76; G16H 50/30
See application file for complete search history.

(56) References Cited

U.S. PATENT DOCUMENTS

| | | | |
|---|---|---|---|
| 5,422,861 A | 6/1995 | Stringer et al. | |
| 6,075,603 A | 6/2000 | O'Meara et al. | |
| 11,520,439 B1 | 12/2022 | Ciotirca et al. | |
| 2011/0232360 A1 | 9/2011 | Deangelo et al. | |
| 2016/0018948 A1* | 1/2016 | Parvarandeh | G06F 1/163 345/175 |
| 2016/0041130 A1 | 2/2016 | Auffray et al. | |
| 2018/0341359 A1* | 11/2018 | Khajeh | G06F 1/1656 |
| 2020/0160018 A1* | 5/2020 | Panchawagh | H10N 30/857 |

FOREIGN PATENT DOCUMENTS

WO 2022/039844 A1 2/2022

* cited by examiner

*Primary Examiner* — Md Saiful A Siddiqui
(74) *Attorney, Agent, or Firm* — Harrity & Harrity, LLP

(57) ABSTRACT

A method for calibrating an ultrasonic touch sensor includes generating a sequence of excitation signals, including sweeping a signal parameter such that the signal parameter is set to different parameter values; sequentially transmitting the plurality of ultrasonic transmit waves based on the sequence of excitation signals; receiving a plurality of ultrasonic reflected waves; generating a plurality of measurement signals representative of the plurality of ultrasonic reflected waves, wherein each measurement signal corresponds to a respective ultrasonic reflected wave of the plurality of ultrasonic reflected waves; determining a cumulative signal energy for each measurement signal; determining which measurement signal out of the plurality of measurement signals has a highest cumulative signal energy; and configuring, for a touch detection operation, the signal parameter with the parameter value that corresponds to the measurement signal having the highest cumulative signal energy.

21 Claims, 8 Drawing Sheets

AUTOCALIBRATION OF ACOUSTICAL STIMULATION SIGNAL FOR ULTRASONIC TOUCH SENSOR

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event and can be used to discriminate between the existence or the non-existence of the touch event.

SUMMARY

In some implementations, an ultrasonic touch sensor includes a housing having an ultrasound chamber; a touch structure comprising a touch surface configured to receive a touch, wherein the touch structure is coupled to the housing and arranged over the ultrasound chamber; a signal generator configured to generate a first sequence of first excitation signals for producing a plurality of first ultrasonic transmit waves, wherein the signal generator is configured to generate the first sequence of first excitation signals by sweeping a first signal parameter in a first signal parameter range such that the first signal parameter is set to a first parameter value that is different for each first excitation signal; a transmitter arranged within the ultrasound chamber, wherein the transmitter is configured to receive the first sequence of first excitation signals and sequentially transmit the plurality of first ultrasonic transmit waves toward the touch structure based on the first sequence of first excitation signals, wherein each first ultrasonic transmit wave corresponds to a respective first excitation signal of the first sequence of first excitation signals; a receiver arranged within the ultrasound chamber, wherein the receiver is configured to receive a plurality of first ultrasonic reflected waves, wherein each first ultrasonic reflected wave is produced by a reflection of a respective first ultrasonic transmit wave of the plurality of first ultrasonic transmit waves, and wherein the receiver is configured to generate a plurality of first measurement signals representative of the plurality of first ultrasonic reflected waves, wherein each first measurement signal corresponds to a respective first ultrasonic reflected wave of the plurality of first ultrasonic reflected waves; and a measurement circuit coupled to the receiver and configured to determine a first cumulative signal energy for each first measurement signal, determine which first measurement signal out of the plurality of first measurement signals has a highest first cumulative signal energy, and configure, for a touch detection operation, the first signal parameter used by the signal generator with the first parameter value that corresponds to the first measurement signal having the highest first cumulative signal energy.

In some implementations, an ultrasonic touch sensor includes a housing having an ultrasound chamber; a touch structure comprising a touch surface configured to receive a touch, wherein the touch structure is coupled to the housing and arranged over the ultrasound chamber; a signal generator configured to generate a sequence of excitation signals for producing a plurality of ultrasonic transmit waves, wherein the signal generator is configured to generate the sequence of excitation signals by varying a first signal parameter according to a plurality of first parameter values and varying a second signal parameter according to a plurality of second parameter values such that each excitation signal is different based on different combinations of a first parameter value of the plurality of first parameter values and a second parameter value of the plurality of second parameter values; a transmitter arranged within the ultrasound chamber, wherein the transmitter is configured to receive the sequence of excitation signals and sequentially transmit the plurality of ultrasonic transmit waves toward the touch structure based on the sequence of excitation signals, wherein each ultrasonic transmit wave corresponds to a respective excitation signal of the sequence of excitation signals; a receiver arranged within the ultrasound chamber, wherein the receiver is configured to receive a plurality of ultrasonic reflected waves, wherein each ultrasonic reflected wave is produced by a reflection of a respective ultrasonic transmit wave of the plurality of ultrasonic transmit waves, and wherein the receiver is configured to generate a plurality of measurement signals representative of the plurality of ultrasonic reflected waves, wherein each measurement signal corresponds to a respective ultrasonic reflected wave of the plurality of ultrasonic reflected waves; and a measurement circuit coupled to the receiver and configured to determine a cumulative signal energy for each measurement signal, determine which measurement signal out of the plurality of measurement signals has a highest cumulative signal energy, and configure, for a touch detection operation, the first signal parameter and the second signal parameter used by the signal generator with the first parameter value and the second parameter value that correspond to the measurement signal having the highest cumulative signal energy.

In some implementations, a method for calibrating an ultrasonic touch sensor includes generating a sequence of excitation signals, including sweeping a signal parameter such that the signal parameter is set to a parameter value that is different for each excitation signal; sequentially transmitting a plurality of ultrasonic transmit waves based on the sequence of excitation signals, wherein each ultrasonic transmit wave corresponds to a respective excitation signal of the sequence of excitation signals; receiving a plurality of ultrasonic reflected waves, wherein each ultrasonic reflected wave is produced by a reflection of a respective ultrasonic transmit wave of the plurality of ultrasonic transmit waves; generating a plurality of measurement signals representative of the plurality of ultrasonic reflected waves, wherein each measurement signal corresponds to a respective ultrasonic reflected wave of the plurality of ultrasonic reflected waves; determining a cumulative signal energy for each measurement signal; determining which measurement signal out of the plurality of measurement signals has a highest cumulative signal energy; and configuring, for a touch detection operation, the signal parameter with the parameter value that corresponds to the measurement signal having the highest cumulative signal energy.

BRIEF DESCRIPTION OF THE DRAWINGS

Implementations are described herein with reference to the appended drawings.

DETAILED DESCRIPTION

Figure 1:
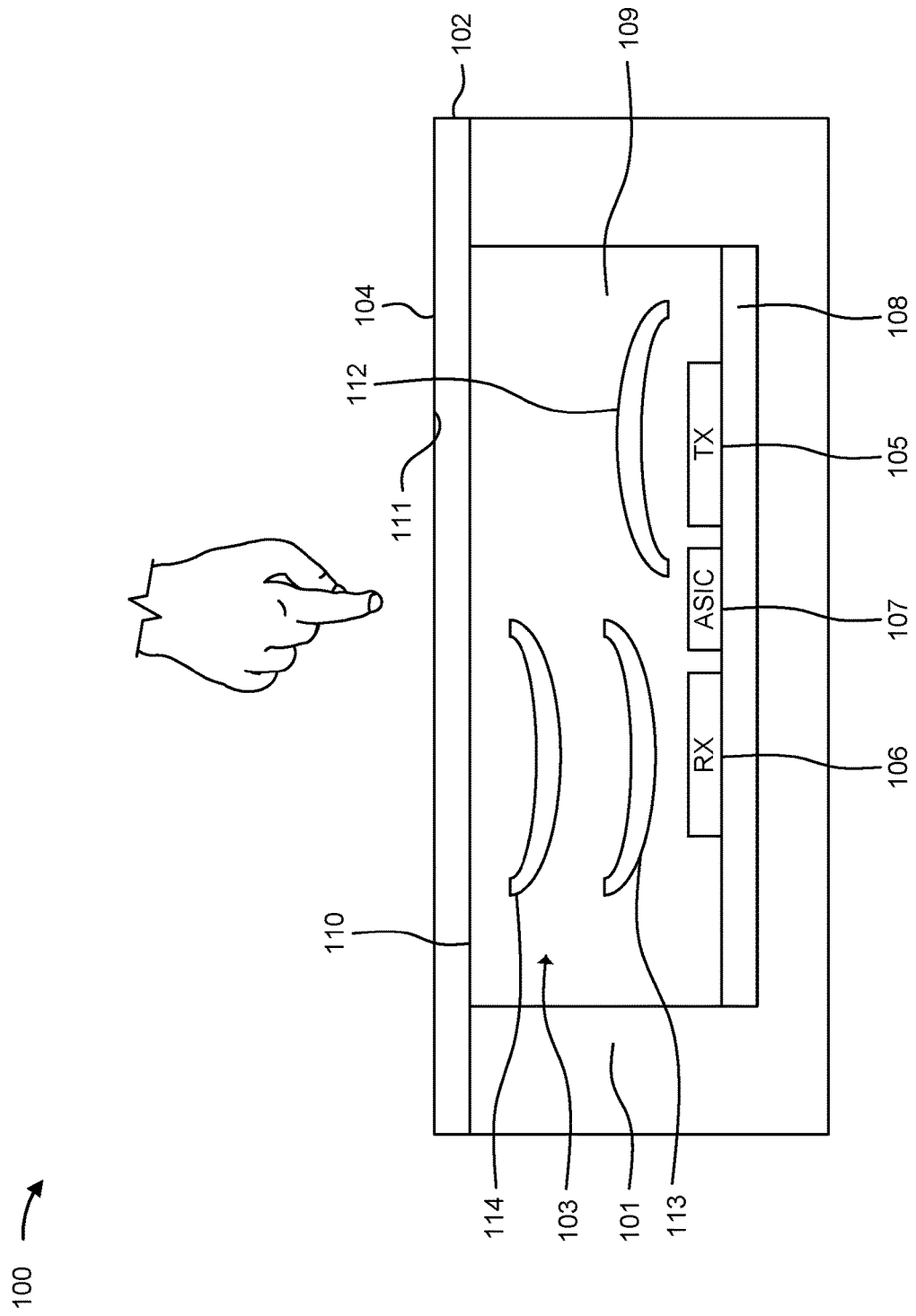
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electrical signal (e.g., a current signal or a voltage signal). The property to be measured may, for example, comprise a magnetic field, an electric field, an electromagnetic wave (e.g., a radio wave), a pressure, a force, a current, or a voltage, but is not limited thereto. For an ultrasonic touch sensor, the property to be measured is an ultrasound wave produced, for example, by a microelectromechanical system (MEMS) transducer.

An ultrasound transmit wave may be directed at a touch structure where the ultrasound transmit wave is reflected back by the touch structure as a reflected ultrasound wave. The reflected ultrasound wave can be used for sensing touch (e.g., a touch event) at a touch surface of the touch structure. Specifically, the ultrasonic touch sensor can use the reflected ultrasound wave to discriminate between an existence of the touch event or a non-existence of the touch event (e.g., a no-touch event).

The MEMS transducer may be stimulated by an excitation signal (e.g., an acoustical stimulation signal) that causes the MEMS transducer to produce the ultrasound transmit wave. A waveform of the ultrasound transmit wave depends on a waveform of the excitation signal. Thus, different excitation signals can be used to produce different ultrasound transmit waves. Furthermore, a quality of the reflected ultrasound wave (e.g., a detected acoustical signal) depends on the waveform of the ultrasound transmit wave and system properties of the ultrasonic touch sensor. A mismatch between the waveform of the ultrasound transmit wave and the system properties may cause a degradation in the quality of the reflected ultrasound wave. The quality of the reflected ultrasound wave can affect the reliability of the sensing, including the detection of a touch or no-touch event.

For example, the system properties may include one or more properties of the touch structure, such as composition (e.g., material) or thickness, one or more properties of an ultrasonic chamber, such as depth, one or more properties of a coupling medium, such as composition, and one or more properties of an environment, such as temperature or pressure. Thus, the system properties may include structural properties that may vary based on design of the ultrasonic touch sensor and environmental properties that may vary based on the environment in which the ultrasonic touch sensor resides. Because environmental properties may change over time, ultrasonic touch sensors that may be considered structurally equivalent (e.g., having similar structural properties) may be located in different environments (e.g., different ambient temperature environments and/or different ambient pressure environments) and therefore may be subject to different environmental properties that can affect the quality of the reflected ultrasound wave.

Presently, costly manual calibration procedures may be used for calibrating an ultrasonic touch sensor at a time of manufacture. However, these manual calibration procedures are time consuming and require complex technical equipment. In addition, these manual calibration procedures may involve a human operator for visually selecting a best estimated response signal out of a very large data set, which is time consuming and prone to human error. Moreover, calibrating an ultrasonic touch sensor at a time of manufacture may not be sufficient, because one or more system properties (e.g., one or more environmental properties) may change over time, including during operation (e.g., during runtime) of the ultrasonic touch sensor.

Some implementations disclosed herein are directed to an ultrasonic touch sensor that is configured to perform an autocalibration based on one or more system properties of the ultrasonic touch sensor. For example, the ultrasonic touch sensor may be configured to automatically calibrate one or more properties of an excitation signal to be used for a touch detection operation based on a sequence of measurements. For example, the ultrasonic touch sensor may be configured to automatically configure itself by calibrating one or more properties of the excitation signal based on an amplitude characteristic of a sequence of reflected ultrasound waves produced by different excitation signals.

The autocalibration may be executed based on monitoring the system parameters over a lifetime of the ultrasonic touch sensor in order to ensure that an optimal quality of a reflected ultrasound wave is achieved. In other words, the autocalibration may be executed such that a mismatch between the waveform of the ultrasound transmit wave and the system properties is reduced. In some implementations, the autocalibration may be executed during each startup of the ultrasonic touch sensor. Additionally, or alternatively, the autocalibration may be executed during runtime of the ultrasonic touch sensor. For example, the autocalibration may be executed periodically during runtime of the ultrasonic touch sensor.

In some implementations, the ultrasonic touch sensor may be configured to vary or sweep at least one stimulation signal parameter of the excitation signal (e.g., frequency or a number of cycles in a single signal burst) to produce the sequence of reflected ultrasound waves. For each reflected ultrasound wave of the sequence of reflected ultrasound waves, the ultrasonic touch sensor may compute an envelope, and apply a set of criteria by computing a cumulative amplitude for each computed envelope in order to determine a best response signal (e.g., a best reflected ultrasound wave) and, by extension, a best excitation signal. After determining an ideal combination of stimulation signal parameters (e.g., frequency and number of cycles), the ultrasonic touch sensor may store these parameters for excitation signals used in the touch detection operation.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material cast in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the ultrasonic touch sensor 100. In the example shown, the ultrasound chamber 103 is a chamber that is formed by the enclosure of the frame 101 and the touch structure 102. The touch structure 102 may be made of one or more metal layers, one or more plastic layers, and/or one or more layers made out of another solid material. The touch structure 102 includes a touch surface 104 at its external interface with an environment. The touch surface 104 is arranged and operable to receive contact (e.g., touches) from a user that can be detected by sensor circuitry.

In some implementations, lateral sides of the frame 101 may be at least partially open such that the ultrasound chamber 103 is not a fully enclosed volume. For example, the lateral sides of the frame 101 may include columns that support the touch structure 102, and/or the touch structure 102 may be supported by a coupling medium. For example, the coupling medium, such as a film layer, a silicone gel, or a soft epoxy, may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases in which the lateral sides of the ultrasound chamber 103 are fully open.

The ultrasound chamber 103 contains the sensor circuitry used for detecting no-touch events and touch events at the touch surface 104. A touch event is an instance when the user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducers (CMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal (e.g., an acoustical stimulation signal) and transmit the excitation signal to the transmitter 105. The excitation signal is applied across the biased electrodes, causing the flexible membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interact with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113, and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the differ-ence is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104 based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch event and a no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch event and a no-touch event using a machine learning model. The machine learning model may include and/or may be associated with, for example, a neural network. In some implementations, the sensor circuit 107 uses the machine learning model to distinguish between a touch event and a no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoidal, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such a down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided merely as an example. Other examples are possible and may differ from what was described with regard to FIG. 1. For example, in some implementations, an array of transmitters, receivers, or transceivers may be provided within the ultrasound chamber 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

Figure 2:
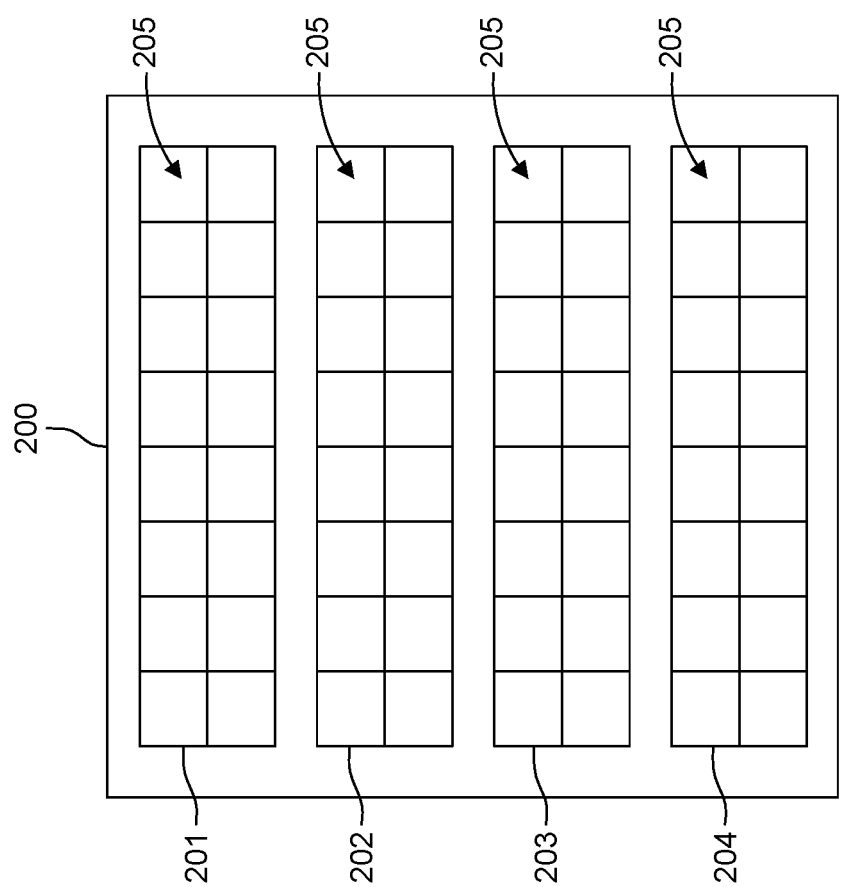
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the ultrasound chamber 103 to cover a substantial area under the touch structure 102. The array of transceiver transducers 200 may include two or more sub-arrays 201-204 that each include a subset of transceiver transducers 205. Individual transceiver transducers 205 of the array 200 are configurable as transmitters, receivers, or transceivers. Additionally, the individual transceiver transducers 205 of the array 200 may be individually configured into a receiving mode, a transmitting mode, or a transceiving mode on a static (e.g., fixed) basis or on a dynamic basis. As a result, the transceiver transducers 205 may be configured to provide a configuration best suited for making a touch/no-touch decision.

This configurability may be set on an individual basis (transducer-by-transducer), on a sub-array basis, or on some other basis. Moreover, while the transceiver transducers 205 are shown to be substantially equal in size, the transceiver transducers 205 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 205 of the array 200 is separately controllable by the sensor circuit 107. The transceiver transducers 205 may be individually excited, alone or in combination, as transmitters and may be individually configured, alone or in combination, for receiving ultrasound waves. When one or more transceiver transducers 205 are excited, each transceiver transducer 205 produces its own ultrasonic transmit wave with acoustic aperture or beam width (e.g., proportional to the size of the membrane). If two or more transceiver transducers 205 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but the individual wavefronts may combine in front of the array 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 205 is excited or multiple transceiver transducers 205 are excited, the main directivity lobe has one or more directivity characteristics that can be adjusted by a controller. Directivity characteristics of the main directivity lobe includes transmission direction, orientation angle, acoustic aperture size, beam width, or beam height, among other examples. As a result, beam sizing, beam forming, and beam steering can be realized by modulating the activation of the transceiver transducers 205 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more transceiver transducers and determine whether a no-touch event or a touch event has occurred at the touch surface 104 based on at least one measurement signal received from the array 200. In some implementations, the receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 205 or the operating modes of the transceiver transducers 205.

As indicated above, FIG. 2 is provided merely as an example. Other examples are possible and may differ from what was described with regard to FIG. 2. In some implementations, additional circuit components may be added without deviating from the disclosure provided above.

Figure 3:
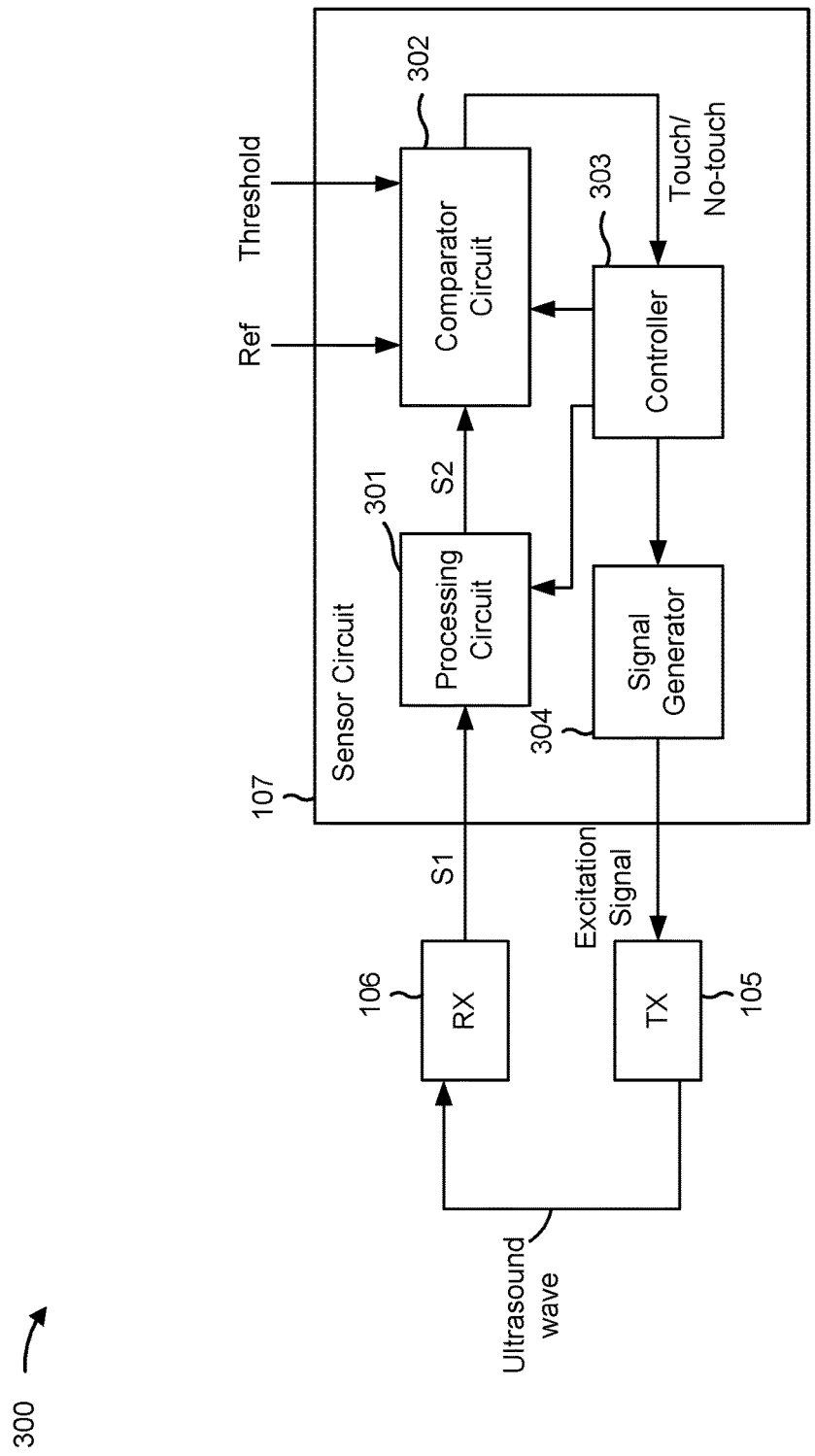
FIG. 3 illustrates a schematic block diagram of an ultrasonic touch sensor according to one or more implementations.

FIG. 3 illustrates a schematic block diagram of an ultrasonic touch sensor 300 according to one or more implementations. The ultrasonic touch sensor 300 is similar to the ultrasonic touch sensor 100 described above in conjunction with FIG. 1. The ultrasonic touch sensor 300 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105.

The ultrasonic touch sensor 300 also includes a sensor circuit 107 that is electrically coupled to the transmitter 105 and the receiver 106. In some implementations, the sensor circuit 107 includes a processing circuit 301, a comparator circuit 302, a controller 303, and a signal generator 304. The processing circuit 301 and the comparator circuit 302 may form a measurement circuit used for measuring signals and determining whether a no-touch event or a touch event has occurred at the touch surface 104.

In some implementations, the controller 303 may control (e.g., trigger) the signal generator 304 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of an ultrasonic reflected wave (e.g., ultrasonic reflected wave 114), which may be evaluated during a corresponding observation window.

The processing circuit 301 is configured to process the measurement signal S1 in order to determine a feature of the measurement signal S1 and generate a measured value S2 based on the feature of the measurement signal S1. In some implementations, the processing circuit 301 may include a processor, included in the sensor circuit 107, that is configured to evaluate the feature of the measurement signal S1 in order to generate the measured value S2 that is representative of the feature of the measurement signal S1. The processor may include an analog processing circuit that operates in an analog domain, a digital processing circuit that operates in a digital domain, or both the analog processing circuit and the digital processing circuit, for evaluating the feature of the measurement signal S1 and for generating the measured value S2. Thus, the measured value S2 may be an analog value or a digital value.

The processor may be operable in combination with other processing components of the processing circuit 301 described herein to generate the measured value. For example, the processing circuit 301 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and generate the measured value S2 from one or more of the multiple digital samples.

In some implementations, the processing circuit 301 (e.g., the processor) may be configured to measure a function of an amplitude of the measurement signal S1 during the corresponding observation window to generate the measured value S2. For example, the measured value S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the processing circuit 301 (e.g., the processor) may be configured to calculate a distance of the measurement signal S1 relative to the reference signal during the corresponding observation window to generate the measured value S2. For example, the processing circuit 301 may calculate a Euclidean distance between the measurement signal S1 and the reference signal as the measured value S2, a squared Euclidian distance between the measurement signal S1 and the reference signal as the measured value S2, a Chebyshev distance between the measurement signal S1 and the reference signal as the measured value S2, a Manhattan distance between the measurement signal S1 and the reference signal as the measured value S2, or a Minkowski distance between the measurement signal S1 and the reference signal as the measured value S2.

The comparator circuit 302 may be configured to perform a comparison of the measurement signal S1 with a threshold and determine whether a no-touch event or a touch event has occurred at the touch surface 104 based on whether the first measurement signal S1 satisfies the threshold. In some implementations, the comparator circuit 302 may compare the measured value S2 to the threshold, detect the no-touch event when the measured value S2 does not satisfy the threshold (e.g., the measured value S2 is equal to or greater than the threshold, the measured value S2 is greater than the threshold, or the measured value S2 does not satisfy another condition relative to the threshold), and detect the touch event when the measured value S2 satisfies the threshold (e.g., the measured value S2 is equal to or less than the threshold, the measured value S2 is less than the threshold, or the measured value S2 satisfies another condition relative to the threshold).

In some implementations, the comparator circuit 302 may detect the no-touch event when a difference between the measured value S2 and a reference value Ref does not satisfy the threshold (e.g., the difference is equal to or less than the threshold, the difference is less the threshold, or the difference satisfies another condition relative to the threshold), and detect the touch event when the difference between the measured value S2 and the reference value Ref satisfies the threshold (e.g., the difference is equal to or greater than the threshold, the difference is greater than the threshold, or the difference satisfies another condition relative to the threshold). For example, the comparator circuit 302 may calculate the difference between the measured value S2 and the reference value Ref for performing a comparison of the difference with the threshold for generating a comparison result.

If the sensor circuit 107 calculates the measured value S2 as the distance of the measurement signal S1 relative to the reference signal, the comparator circuit 302 may be configured to detect the no-touch event when the measured value S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 302 may be configured to make a touch/no-touch decision based on the comparison result. The comparator circuit 302 may transmit a decision output signal that is indicative of the touch/no-touch decision to the controller 303 that may be configured to perform additional actions or functions based on a result of the touch/no-touch decision.

As indicated above, FIG. 3 is provided merely as an example. Other examples are possible and may differ from what was described with regard to FIG. 3. The number and arrangement of components shown in FIG. 3 are provided as an example. In practice, the ultrasonic touch sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the ultrasonic touch sensor 300 may perform one or more functions described as being performed by another set of components of the ultrasonic touch sensor 300. In some implementations, the ultrasonic touch sensor 300 may be configured to target any ultrasonic reflected wave for measurement that undergoes a change in response to a touch event (e.g., a direct touch event or an indirect touch event) occurrent at the touch surface 104 or a change in response to a change in touch environment. Such a configuration would provide the ultrasonic touch sensor 300 flexibility to accommodate different types of touch structures, different types of touch gestures, and/or different types of touch environments.

Figure 4:
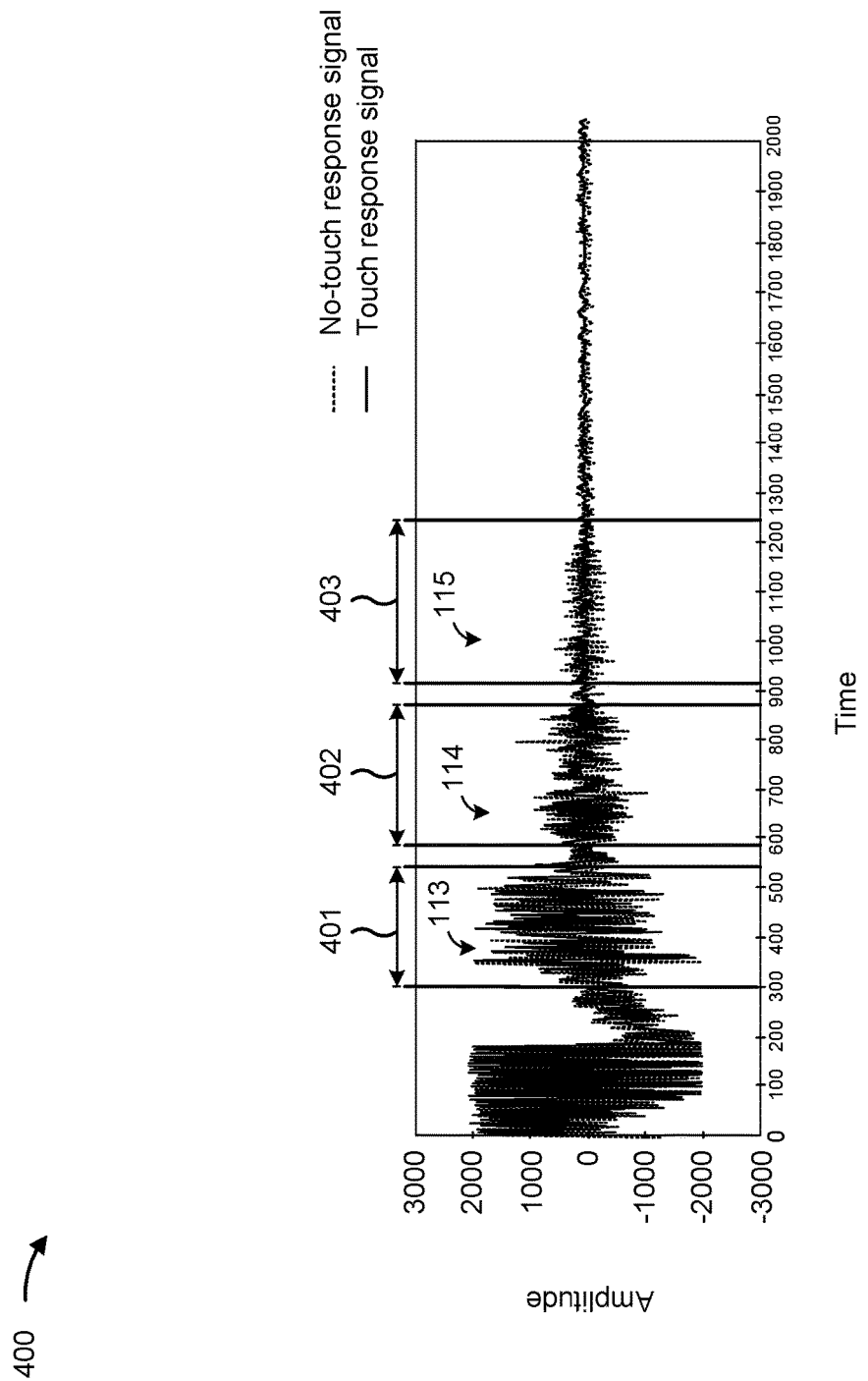
FIG. 4 illustrates a waveform diagram including a no-touch response signal and a touch response signal according to one or more implementations.

FIG. 4 illustrates a waveform diagram 400 including a no-touch response signal and a touch response signal according to one or more implementations. The no-touch response signal is representative of ultrasonic reflected waves produced by reflection of a single ultrasonic transmit wave (e.g., the ultrasonic transmit wave 112) during a no-touch event and received by the receiver 106. The touch response signal is representative of ultrasonic reflected waves produced by reflection of a single ultrasonic transmit wave (e.g., the ultrasonic transmit wave 112) during a touch event and received by the receiver 106. Both the no-touch response signal and the touch response signal may be processed by the sensor circuit 107 as measurement signals (e.g., raw data). Thus, the waveform diagram 400 may illustrate a single excitation frame.

The ultrasonic reflected waves produced by reflection may include ultrasonic reflected waves 113 and 114. In addition, the ultrasonic reflected waves produced by reflection may include secondary reflections 115 produced by, for example, the second interface 111 due to multiple internal reflections within the touch structure 102. Accordingly, the secondary reflections 115 may be received by the receiver 106 after being reflected back by the second interface.

The ultrasonic reflected wave 113 may be received by the receiver 106 during a first observation window 401. Thus, the first observation window 401 is a time interval during which the ultrasonic reflected wave 113 corresponding to the ultrasonic transmit wave 112 is expected to be received by the receiver 106. The first observation window 401 may be configured based on the principle of time-of-flight. As a result, the first observation window 401 may be predetermined for each excitation frame. The sensor circuit 107 may be configured to sample a response signal (e.g., a measurement signal) during the first observation window 401 to measure and evaluate the ultrasonic reflected wave 113.

As noted above, the acoustic impedance change resulting from the touch event may be minimal at the first interface 110. As a result, the acoustic impedance change may not cause a measurable change in a property of the ultrasonic reflected wave 113. Thus, during the first observation window 401, the no-touch response signal and the touch response signal may be substantially similar to each other. While the ultrasonic reflected wave 113 may not be useful for making a touch/no-touch decision, the ultrasonic reflected wave 113 may be useful for calibrating the excitation signals used for a touch detection operation.

The ultrasonic reflected wave 114 may be received by the receiver 106 during a second observation window 402. Thus, the second observation window 402 is a time interval during which the ultrasonic reflected wave 114 corresponding to the ultrasonic transmit wave 112 is expected to be received by the receiver 106. The second observation window 402 may be configured based on the principle of time-of-flight. As a result, the second observation window 402 may be predetermined for each excitation frame. The sensor circuit 107 may be configured to sample a response signal (e.g., a measurement signal) during the second observation window 402 to measure and evaluate the ultrasonic reflected wave 114.

During the second observation window 402, there may be a measurable amplitude change between the no-touch response signal and the touch response signal that can be evaluated by the sensor circuit 107 for making a touch/no-touch decision. For example, an amplitude of the ultrasonic reflected wave 114 may be reduced during a touch event in comparison to a no-touch event. The sensor circuit 107 may be configured to detect a reduction in amplitude of the touch response signal during the second observation window 402 to detect a touch. In addition, the ultrasonic reflected wave 114 may be useful for calibrating the excitation signals used for a touch detection operation.

The secondary reflections 115 may be received by the receiver 106 during a third observation window 403. Thus, the third observation window 403 is a time interval during which the secondary reflections 115 corresponding to the ultrasonic transmit wave 112 are expected to be received by the receiver 106. The third observation window 403 may be configured based on the principle of time-of-flight. As a result, the third observation window 403 may be predetermined for each excitation frame. The sensor circuit 107 may be configured to sample a response signal (e.g., a measurement signal) during the third observation window 403 to measure and evaluate the secondary reflections 115. The secondary reflections 115 may be useful for calibrating the excitation signals used for a touch detection operation. Furthermore, in some implementations, the secondary reflections 115 may be used by the sensor circuit 107 for making a touch/no-touch decision.

As indicated above, FIG. 4 is provided as an example. Other examples may differ from what is described with regard to FIG. 4.

Figure 5:
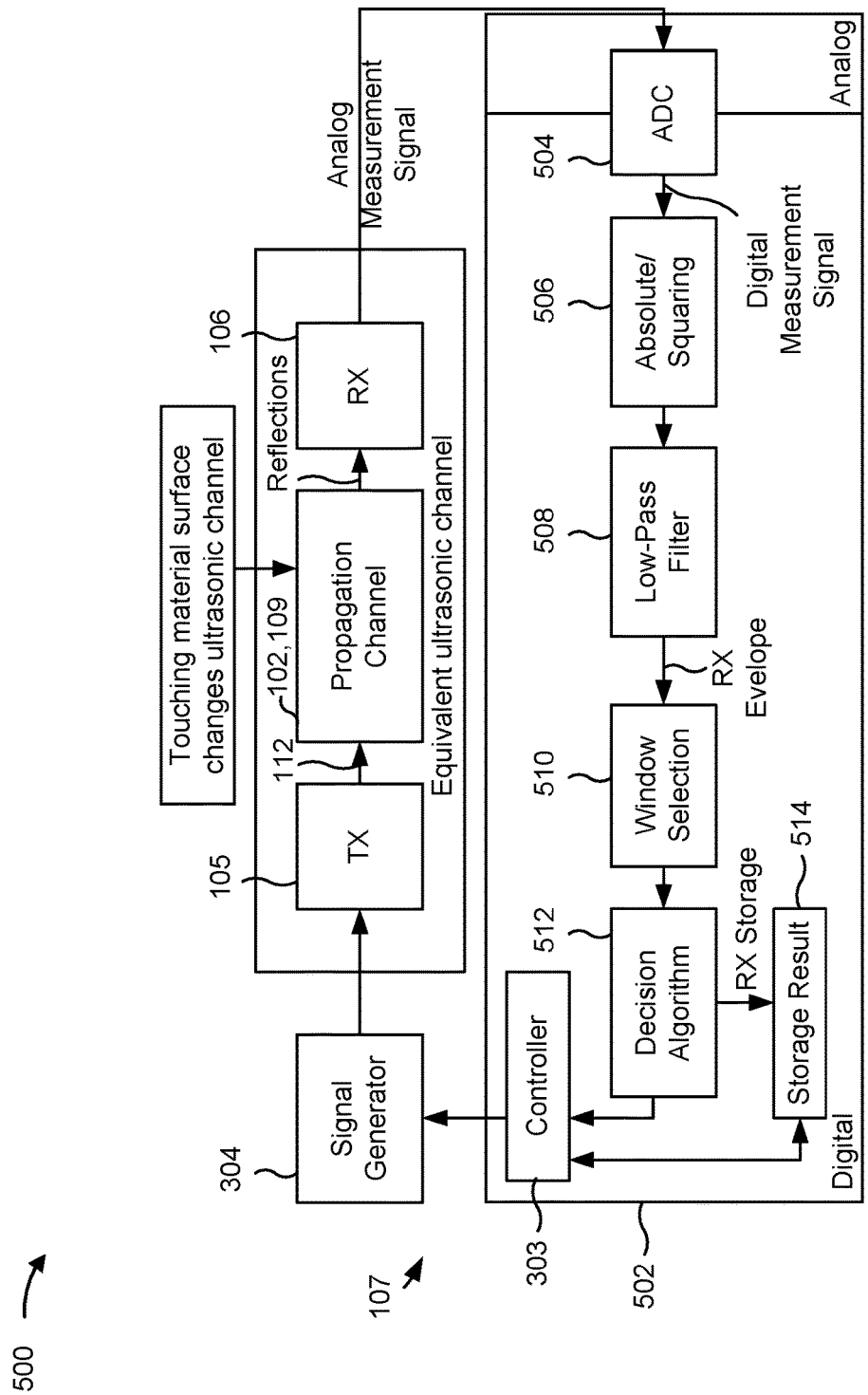
FIG. 5 illustrates a schematic block diagram of an ultrasonic touch sensor according to one or more implementations.

FIG. 5 illustrates a schematic block diagram of an ultrasonic touch sensor 500 according to one or more implementations. The ultrasonic touch sensor 500 may be similar to the ultrasonic touch sensor 100 described above in conjunction with FIG. 1 and/or the ultrasonic touch sensor 300 described above in conjunction with FIG. 3. The ultrasonic touch sensor 500 may include the transmitter 105 and the receiver 106 acoustically coupled by a propagation channel. The propagation channel may include the coupling medium 109 and the touch structure 102, including the first interface 110 and the second interface 111. The ultrasonic touch sensor 500 may further include the sensor circuit 107 that includes the signal generator 304 and a measurement circuit 502. The measurement circuit 502 may include the controller 303, processing components 504, 506, 508, 510, and 512, and a memory 514 configured to store signal parameters to be used for a touch detection operation (e.g., during a touch detection mode). The processing components 504, 506, 508, 510, and 512 may be part of a processing circuit (e.g., processing circuit 301) that includes an analog domain and a digital domain.

The ultrasonic touch sensor 500 may be configurable into an autocalibration mode and touch detection mode. In some implementations, the mode of the ultrasonic touch sensor 500 may be configured by the controller 303. In the autocalibration mode, the controller 303 may be configured to perform an autocalibration to calibrate or otherwise configure one or more signal parameters used by the signal generator 304 for generating excitation signals. For example, a signal parameter may be a frequency of an excitation signal or a number of pulses in each signal burst of the excitation signal. Increasing the number of pulses is equivalent to increasing an amount of energy injected into the system.

In some implementations, the excitation signals have a rectangular waveform that defines alternating active signal intervals and inactive signal intervals. Thus, the frequency of an excitation signal may be a number of times that the waveform alternates between an active signal interval and an inactive signal interval in a second. The active signal interval may be referred to as a signal burst. During each active signal interval or signal burst, the excitation may comprise a number of signal pulses used for generating an ultrasonic wave. Each signal parameter may be defined by a corresponding parameter value. For example, a parameter value may be a value that defines the frequency of the excitation signal or a parameter value may be a value that defines the number of pulses in each signal burst of the excitation signal.

In some implementations, a parameter value for a first signal parameter of the excitation signals may be selected from a first signal parameter range. For example, the frequency may be selected from the first signal parameter range (e.g., a frequency range of 1 MHz to 3.5 MHz). In some implementations, a parameter value for a second signal parameter of the excitation signals may be selected from a second signal parameter range. For example, the number of pulses in each signal burst may be selected from the second signal parameter range (e.g., 1 to 30 pulses).

Parameter values for the signal parameters determined during the autocalibration mode may be stored in the memory 514 for use during the touch detection mode. In the touch detection mode, the ultrasonic touch sensor 500 may perform the touch detection operation using the parameter values stored in memory 514. For example, the controller 303 may configure the signal generator 304 with the parameter values stored in memory 514 for generating excitation signals used for the touch detection operation. In other words, the signal generator 304 may be configured to generate the excitation signals with the parameter values (e.g., the frequency and/or the number of pulses in each signal burst) determined during the autocalibration mode.

The signal generator 304 is configured to generate an excitation signal during an excitation frame and transmit the excitation signal to the transmitter 105, which in turn generates the ultrasonic transmit wave 112 for transmission along the propagation channel based on the excitation signal. The receiver 106 receives the ultrasound reflections corresponding to the ultrasonic transmit wave 112 and generates an analog measurement signal (e.g., a response signal) that corresponds to the ultrasound reflections. The receiver 106 may be configured to transmit the analog measurement signal to the measurement circuit 502 for processing and analysis.

During the autocalibration mode, the signal generator 304 may be configured to generate a first sequence of first excitation signals for producing a plurality of first ultrasonic transmit waves (e.g., a plurality of ultrasonic transmit waves 112). In other words, the first sequence of first excitation signals may be generated over a plurality of excitation frames, with each of the first excitation signals corresponding to a respective excitation frame. The signal generator 304 may be configured to generate the first sequence of first excitation signals by sweeping or varying a first signal parameter in a first signal parameter range such that the first signal parameter is set to a first parameter value that is different for each first excitation signal. As a result, each of the first excitation signals are different. For example, in some implementations, the first signal parameter is a frequency. Thus, each of the first excitation signals may have a different frequency within the first signal parameter range. Alternatively, in some implementations, the first signal parameter is a number of pulses in a signal burst. Thus, each of the first excitation signals may have a different number of pulses within the first signal parameter range.

During the autocalibration mode, the transmitter 105 may be configured to receive the first sequence of first excitation signals and sequentially transmit the plurality of first ultrasonic transmit waves toward the touch structure 102 based on the first sequence of first excitation signals. Each first ultrasonic transmit wave corresponds to a respective first excitation signal of the first sequence of first excitation signals.

During the autocalibration mode, the receiver 106 may be configured to receive a plurality of first ultrasonic reflected waves (e.g., ultrasonic reflected wave 113, ultrasonic reflected wave 114, or secondary reflections 115) wherein each first ultrasonic reflected wave is produced by a reflection of a respective first ultrasonic transmit wave of the plurality of first ultrasonic transmit waves. The receiver 106 may be configured to generate a plurality of first measurement signals (e.g., a plurality of analog measurement signals) representative of the plurality of first ultrasonic reflected waves. Each first measurement signal corresponds to a respective first ultrasonic reflected wave of the plurality of first ultrasonic reflected waves.

During the autocalibration mode, the measurement circuit 502 may be configured to determine a first cumulative signal energy for each first measurement signal, determine which first measurement signal out of the plurality of first measurement signals has a highest first cumulative signal energy, and configure, for the touch detection mode (e.g., for a touch detection operation), the first signal parameter used by the signal generator 304 with the first parameter value that corresponds to the first measurement signal having the highest first cumulative signal energy. In other words, the measurement circuit 502 may determine which excitation signal out of the first sequence of first excitation signals produces a measurement signal at the receiver 106 with the highest cumulative signal energy out of all of the measurement signals. The measurement circuit 502 may identify that excitation signal as an optimal excitation signal having a best match to the system parameters of the ultrasonic touch sensor 500 and use the parameter values of the optimal excitation signal for the touch detection mode. In some implementations, the measurement circuit 502 may store the parameter values of the optimal excitation signal in the memory 514 to be used for configuring the signal generator 304 in the touch detection mode.

In some implementations, the measurement circuit 502 may be configured to measure, for each first measurement signal, the first cumulative signal energy in a respective observation window that corresponds to a reflection interface at which the plurality of first ultrasonic reflected waves are produced. For example, for each first measurement signal, the measurement circuit 502 may be configured to measure the ultrasonic reflected wave 113 received in the first observation window 401. Thus, the measurement circuit 502 may be configured to measure the cumulative signal energy of the ultrasonic reflected wave 113 received in each excitation frame for determining which ultrasonic reflected wave 113 has the highest cumulative signal energy out of all of the ultrasonic reflected waves 113.

Alternatively, for each first measurement signal, the measurement circuit 502 may be configured to measure the ultrasonic reflected wave 114 received in the second observation window 402. Thus, the measurement circuit 502 may be configured to measure the cumulative signal energy of the ultrasonic reflected wave 114 received in each excitation frame for determining which ultrasonic reflected wave 114 has the highest cumulative signal energy out of all of the ultrasonic reflected waves 114.

Alternatively, for each first measurement signal, the measurement circuit 502 may be configured to measure the secondary reflections 115 received in the third observation window 403. Thus, the measurement circuit 502 may be configured to measure the cumulative signal energy of the secondary reflections 115 received in each excitation frame for determining which secondary reflection 115 has the highest cumulative signal energy out of all of the secondary reflections 115.

In some implementations, the measurement circuit 502 may be configured to generate an envelope for each first measurement signal, and calculate the first cumulative signal energy within a predetermined observation window for each envelope as the first cumulative signal energy for a respective first measurement signal. The predetermined observation window may be the first observation window 401, the second observation window 402, or the third observation window 403. The same observation window should be used for analyzing each of the first measurement signals so that the cumulative signal energies calculated for each of the first measurement signals can be compared. In other words, each first ultrasonic reflected wave being analyzed is produced by a reflection of a respective first ultrasonic transmit wave at a same reflection interface (e.g., the first interface 110, the second interface 111 by initial reflection, or the second interface 111 by secondary reflection) of the touch structure 102.

In some implementations, the first cumulative signal energy may be a cumulative amplitude calculated over a duration of a predetermined observation window that corresponds to a respective first ultrasonic reflected wave. Again, while the predetermined observation window may be the first observation window 401, the second observation window 402, or the third observation window 403, the same observation window should be used for analyzing each of the first measurement signals so that the cumulative amplitude calculated for each of the first measurement signals can be compared. In some implementations, the measurement circuit 502 may be configured to calculate a cumulative peak summation as the cumulative amplitude.

In some implementations, the measurement circuit 502 may be configured to calculate the cumulative amplitude based on a Euclidean distance to a reference signal. For example, the Euclidean distance can be used to determine a strength of a first measurement signal obtained from the predetermined observation window, where the strength is representative of the cumulative signal energy. The Euclidean distance can be computed between the first measurement signal obtained from the predetermined observation window and a reference signal including system noise, thus giving a term of reference between different first measurement signals (e.g., different response signals).

In some implementations, the measurement circuit 502 may be configured to configured to generate an envelope for each first measurement signal, to generate a plurality of envelopes corresponding to the plurality of first measurement signals; calculate a cumulative amplitude for each envelope as the first cumulative signal energy for each first measurement signal; determine which envelope out of the plurality of envelopes has a highest cumulative amplitude as having the highest first cumulative signal energy; and configure, for the touch detection operation, the first signal parameter used by the signal generator 304 with the first parameter value that corresponds to the first measurement signal having the highest cumulative amplitude. In other words, the measurement circuit 502 may determine which excitation signal out of the first sequence of first excitation signals produces a measurement signal (e.g., an envelope) at the receiver 106 with the highest cumulative amplitude out of all of the measurement signals (e.g., out of all of the envelopes). The measurement circuit 502 may identify that excitation signal as the optimal excitation signal having a best match to the system parameters of the ultrasonic touch sensor 500 and use the parameter values of the optimal excitation signal for the touch detection mode. In some implementations, the measurement circuit 502 may store the parameter values of the optimal excitation signal in the memory 514 to be used for configuring the signal generator 304 in the touch detection mode.

After the first parameter value of the first signal parameter is determined for the system parameters of the ultrasonic touch sensor 500, the measurement circuit 502 may be configured to repeat the autocalibration for a second signal parameter that is different than the first signal parameter. For example, the signal generator 304 may be configured to generate a second sequence of second excitation signals for producing a plurality of second ultrasonic transmit waves. The signal generator 304 may be configured to generate the second sequence of second excitation signals by sweeping or varying a second signal parameter in a second signal parameter range such that the second signal parameter is set to a second parameter value that is different for each second excitation signal. As a result, each of the second excitation signals are different. For example, in some implementations, the first signal parameter is a frequency and the second signal parameter is a number of pulses in a signal burst, or vice versa. Thus, each of the second excitation signals may have a different number of pulses within the second signal parameter range.

During the autocalibration mode, the transmitter 105 may be configured to receive the second sequence of second excitation signals and sequentially transmit the plurality of second ultrasonic transmit waves toward the touch structure 102 based on the second sequence of second excitation signals. Each second ultrasonic transmit wave corresponds to a respective second excitation signal of the second sequence of second excitation signals.

During the autocalibration mode, the receiver 106 may be configured to receive a plurality of second ultrasonic reflected waves (e.g., ultrasonic reflected wave 113, ultrasonic reflected wave 114, or secondary reflections 115), wherein each second ultrasonic reflected wave is produced by a reflection of a respective second ultrasonic transmit wave of the plurality of second ultrasonic transmit waves. The receiver 106 may be configured to generate a plurality of second measurement signals (e.g., a plurality of analog measurement signals) representative of the plurality of second ultrasonic reflected waves. Each second measurement signal corresponds to a respective second ultrasonic reflected wave of the plurality of second ultrasonic reflected waves.

During the autocalibration mode, the measurement circuit 502 may be configured to determine a second cumulative signal energy for each second measurement signal, determine which second measurement signal out of the plurality of second measurement signals has a highest second cumulative signal energy, and configure, for the touch detection mode (e.g., for a touch detection operation), the second signal parameter used by the signal generator 304 with the second parameter value that corresponds to the second measurement signal having the highest second cumulative signal energy. In other words, the measurement circuit 502 may determine which excitation signal out of the second sequence of second excitation signals produces a measurement signal at the receiver 106 with the highest cumulative signal energy out of all of the measurement signals. The measurement circuit 502 may identify that excitation signal as an optimal excitation signal having a best match to the system parameters of the ultrasonic touch sensor 500 and use the parameter values of the optimal excitation signal for the touch detection mode. In some implementations, the measurement circuit 502 may store the parameter values of the optimal excitation signal in the memory 514 to be used for configuring the signal generator 304 in the touch detection mode.

In some implementations, the measurement circuit 502 may be configured to vary two or more signal parameters in a single sequence of excitation signals during the autocalibration mode. For example, the signal generator 304 may be configured to generate a sequence of excitation signals for producing a plurality of ultrasonic transmit waves, where the signal generator 304 is configured to generate the sequence of excitation signals by varying a first signal parameter according to a plurality of first parameter values and varying a second signal parameter according to a plurality of second parameter values, such that each excitation signal is different based on different combinations of a first parameter value of the plurality of first parameter values and a second parameter value of the plurality of second parameter values. Thus, the first signal parameter may be swept through the first signal parameter range and the second signal parameter may be swept through the second signal parameter range. For example, the signal generator 304 may set the first signal parameter to a first parameter value, sweep the second signal parameter through the second signal parameter range while maintaining the first signal parameter at the first parameter value, then change the first signal parameter to a further first parameter value, sweep the second signal parameter through the second signal parameter range while maintaining the first signal parameter at the further first parameter value, and so on. In this way, different combinations of a first parameter value of the plurality of first parameter values and a second parameter value of the plurality of second parameter values for each excitation signal of the sequence of excitation signals are obtained.

The measurement circuit 502 may be configured to determine a cumulative signal energy for each measurement signal associated with the sequence of excitation signals, determine which measurement signal out of the plurality of measurement signals has a highest cumulative signal energy, and configure, for the touch detection operation, the first signal parameter and the second signal parameter used by the signal generator 304 with the first parameter value and the second parameter value that correspond to the measurement signal having the highest cumulative signal energy.

The processing component 504 may be an ADC 504, the processing component 506 may be a digital processing circuit 506, the processing component 508 may be a low-pass filter 508, the processing component 510 may be a window selection unit 510, and the processing component 512 may be a digital signal processor 512.

The ADC 504 may be configured to receive the analog measurement signal and convert the analog measurement signal into a digital measurement signal. For example, the ADC 504 may be configured to generate a plurality of digital samples based on the analog measurement signal and output the plurality of digital samples as the digital measurement signal.

The digital processing circuit 506 and the low-pass filter 508 may be configured to generate an envelope for the digital measurement signal. For example, the digital processing circuit 506 may perform an absolute value rectification on the digital measurement signal and perform squaring on the rectified measurement signal. The low-pass filter 508 may receive the processed digital measurement signal, remove high-frequency components from the processed digital measurement signal, and output an envelope signal (e.g., an RX envelope) of the analog measurement signal. In some implementations, the low-pass filter 508 may be a low-pass, second order digital infinite impulse response (IIR) filter.

The window selection unit 510 may be configured to select a portion of the envelope signal for further evaluation by the digital signal processor 512. In other words, the window selection unit 510 may pass along only the selected portion of the envelope signal to the digital signal processor 512 and may discard non-selected portions of the envelope signal as being irrelevant.

For example, the window selection unit 510 may be configured to select the portion of the envelope signal that corresponds to the predetermined observation window for evaluation. As a result, the window selection unit 510 may select the first observation window 401, the second observation window 402, or the third observation window 403 as the predetermined observation window. The same observation window should be used for analyzing each of the envelope signals generated over a plurality of excitation frames so that the cumulative signal energy calculated for each of the envelope signals can be compared for determining an optimal envelope signal, which in turn corresponds to the optimal excitation signal. In some implementations, the window selection unit 510 may be a digital filter. In some implementations, the window selection unit 510 may be part of the digital signal processor 512.

The digital signal processor 512 may be configured to apply a decision algorithm to calculate a cumulative signal energy for the portion of the envelope signal received from the window selection unit 510. Since an envelope signal is generated for each excitation signal, the digital signal processor 512 may be configured to calculate the cumulative signal energy for each envelope signal, or portion thereof, received from the window selection unit 510. In some implementations, the cumulative signal energy may be a cumulative amplitude calculated over a duration of the predetermined observation window that corresponds to a respective ultrasonic reflected wave. In some implementations, the digital signal processor 512 may be configured to calculate a cumulative peak summation as the cumulative amplitude. In some implementations, the digital signal processor 512 may be configured to calculate the cumulative amplitude based on a Euclidean distance to a reference signal.

Once all of the excitation signals of a sequence of excitation signals have been generated and the cumulative signal energy for each respective envelope signal has been calculated, the digital signal processor 512 may apply the decision algorithm to determine which envelope signal has the highest cumulative signal energy (e.g., highest cumulative amplitude) out of all the envelope signals for the predetermined observation window. The digital signal processor 512 may identify the envelope signal having the highest cumulative signal energy as the optimal envelope signal that best matches the system parameters of the ultrasonic touch sensor 500. Since the optimal envelope signal corresponds to an optimal excitation signal, the digital signal processor 512 may configure the signal parameters of the signal generator 304 with the parameter values of the optimal excitation signal for use in the touch detection operation. As a result, the optimal excitation signal may be used for generating ultrasonic transmit waves 112 used during the touch detection mode in order to produce response signals having an optimal quality for the system parameters of the ultrasonic touch sensor 500.

During the touch detection operation, the signal generator 304 may be configured to generate the optimal excitation signal for producing an optimal ultrasonic transmit wave. The optimal excitation signal has one or more parameter values that corresponds to the excitation signal identified during the autocalibration mode as producing the highest cumulative signal energy. The transmitter 105 may be configured to receive the optimal excitation signal and transmit the optimal ultrasonic transmit wave toward the touch structure based on the optimal excitation signal. The receiver 106 may be configured to receive an optimal ultrasonic reflected wave (e.g., an optimal ultrasonic reflected wave 114) produced by a reflection of the optimal ultrasonic transmit wave at the touch structure 102 and generate an optimal measurement signal representative of the optimal ultrasonic reflected wave. The measurement circuit 502 may be configured to perform a comparison based on the optimal measurement signal and a threshold, and determine whether a no-touch event or a touch event has occurred at the touch surface based on whether the optimal measurement signal satisfies the threshold. The measurement circuit 502 may perform the comparison for making a touch/no-touch decision as similarly described in connection with the ultrasonic touch sensor 100.

As indicated above, FIG. 5 is provided merely as an example. Other examples are possible and may differ from what was described with regard to FIG. 5. The number and arrangement of components shown in FIG. 5 are provided as an example. In practice, the ultrasonic touch sensor 500 may include additional components, fewer components, different components, or differently arranged components than those shown in FIG. 5. Two or more components shown in FIG. 5 may be implemented within a single component, or a single component shown in FIG. 5 may be implemented as multiple, distributed components. Additionally, or alternatively, a set of components (e.g., one or more components) of the ultrasonic touch sensor 500 may perform one or more functions described as being performed by another set of components of the ultrasonic touch sensor 500.

Figure 6:
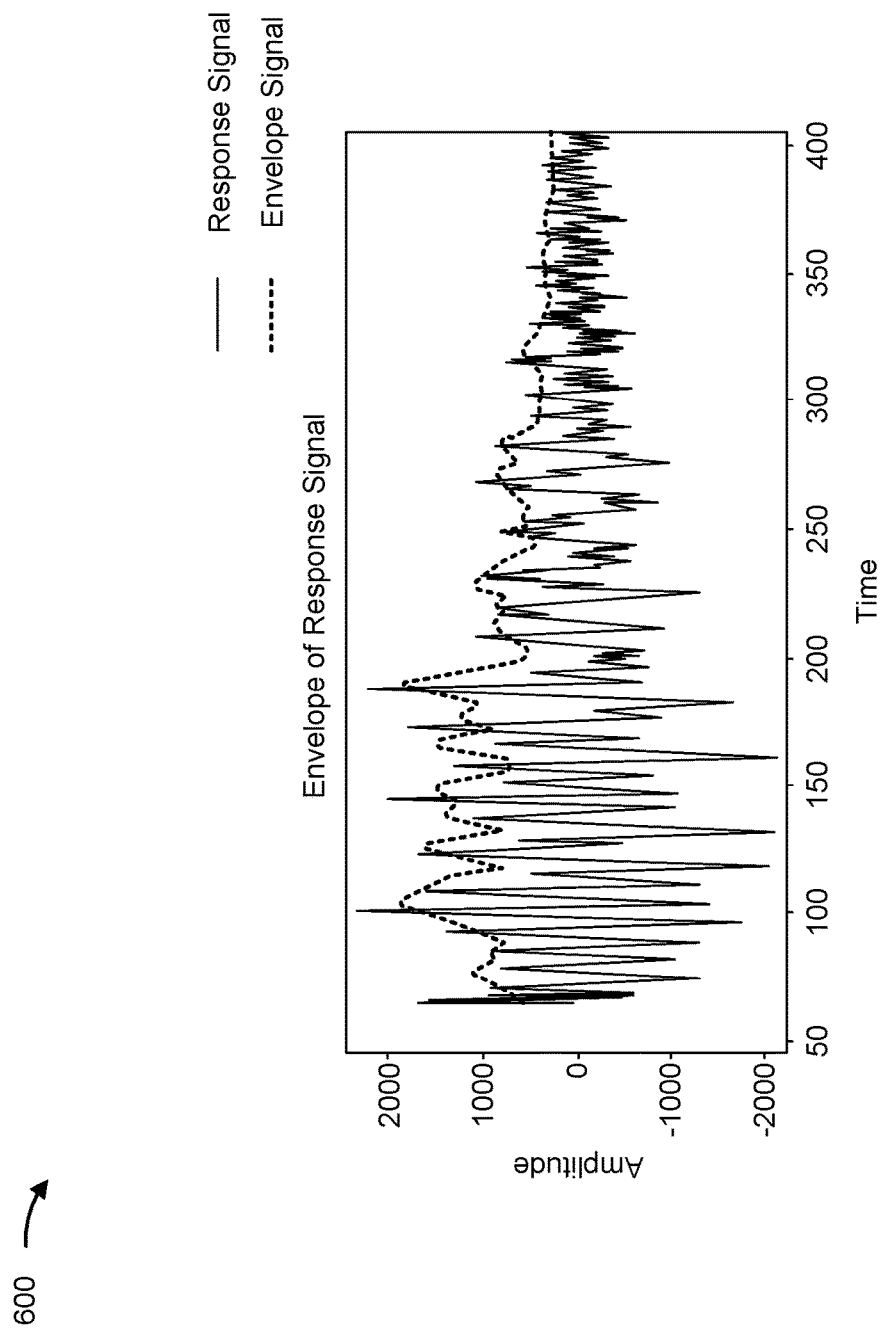
FIG. 6 illustrates a waveform diagram including a response signal and an envelope signal of the response signal according to one or more implementations.

FIG. 6 illustrates a waveform diagram 600 including a response signal and an envelope signal of the response signal according to one or more implementations. For example, the digital processing circuit 506 and the low-pass filter 508 may be configured to generate the envelope signal for the response signal as similarly described above.

As indicated above, FIG. 6 is provided as an example. Other examples may differ from what is described with regard to FIG. 6.

Figure 7A:
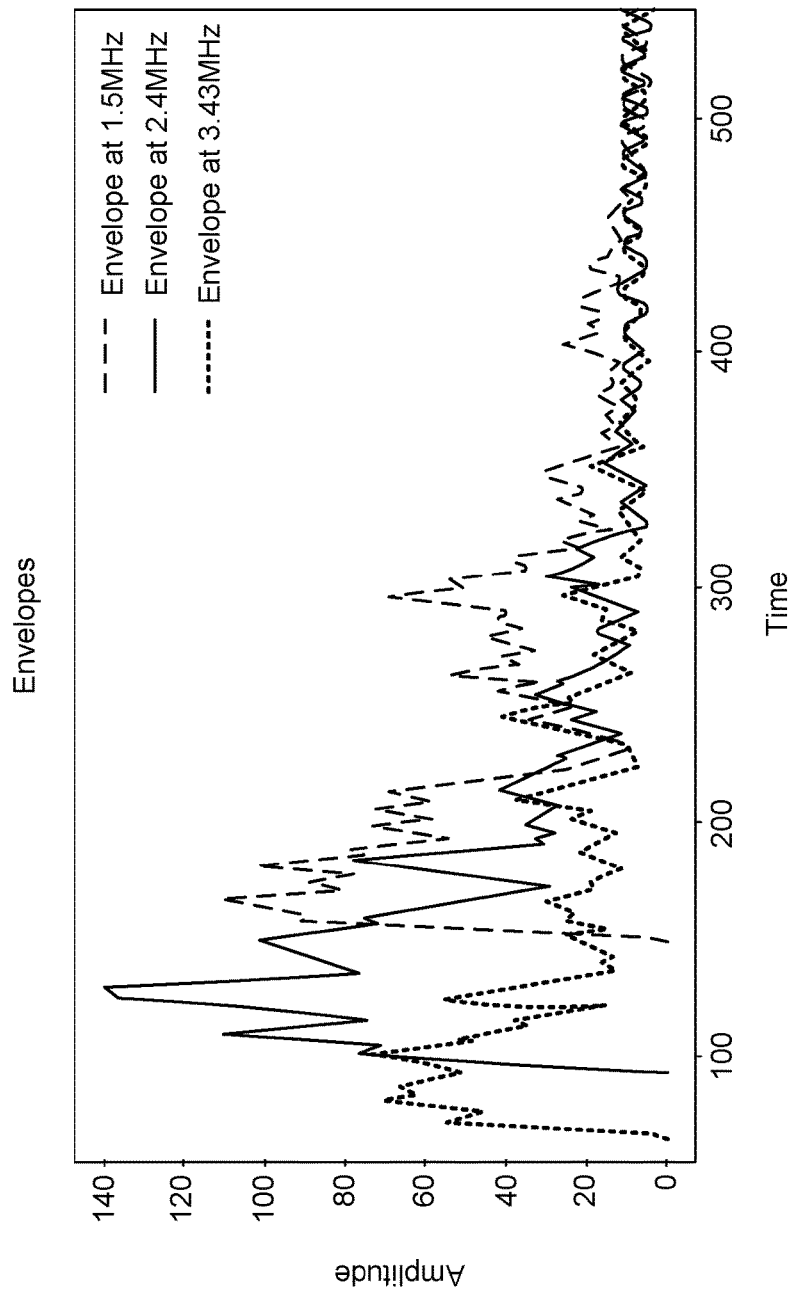
FIG. 7A illustrates a waveform diagram including a plurality of envelopes generated according to one or more implementations.

FIG. 7A illustrates a waveform diagram 700A including a plurality of envelopes generated according to one or more implementations. For example, the plurality of envelopes may include a first envelope that corresponds to a first excitation signal having a first frequency of 1.5 MHz, a second envelope that corresponds to a second excitation signal having a second frequency of 2.4 MHz, and a third envelope that corresponds to a third excitation signal having a third frequency of 3.43 MHz. The plurality of envelopes may correspond to a respective predetermined observation window. While the plurality of envelopes would occur in different excitation frames, the plurality of envelopes are overlapped in the waveform diagram 700A to provide a visual comparison of the plurality of envelopes. In this example, the second envelope has the highest cumulative energy out of the plurality of envelopes. As a result, the second frequency may be selected by the measurement circuit 502 for generating excitation signals used in a touch detection operation.

As indicated above, FIG. 7A is provided as an example. Other examples may differ from what is described with regard to FIG. 7A. For example, a number of envelopes and frequency values may differ from what is described with regard to FIG. 7A.

Figure 7B:
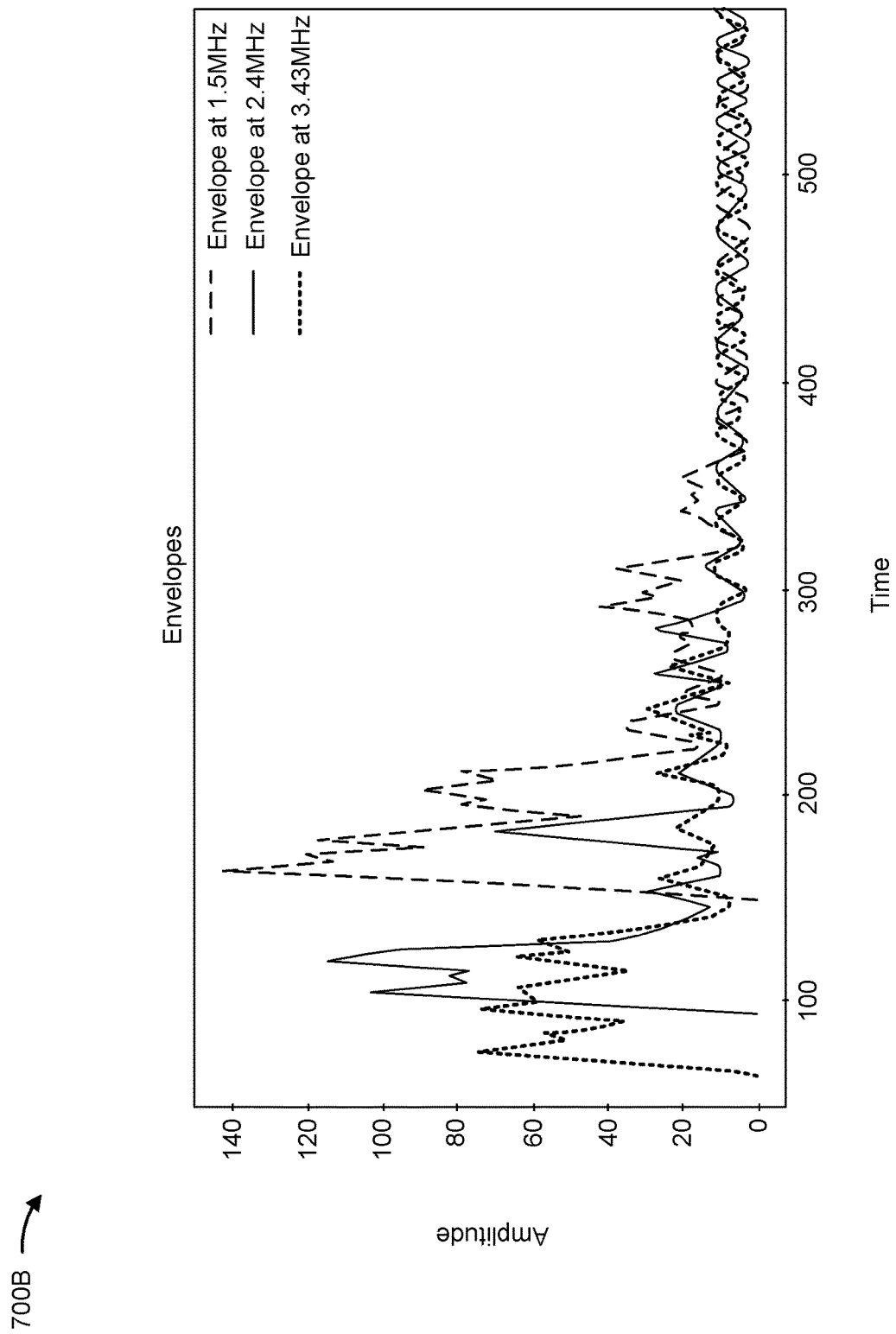
FIG. 7B illustrates a waveform diagram including a plurality of envelopes generated according to one or more implementations.

FIG. 7B illustrates a waveform diagram 700B including a plurality of envelopes generated according to one or more implementations. For example, the plurality of envelopes may include a first envelope that corresponds to a first excitation signal having a first frequency of 1.5 MHz, a second envelope that corresponds to a second excitation signal having a second frequency of 2.4 MHz, and a third envelope that corresponds to a third excitation signal having a third frequency of 3.43 MHz. The plurality of envelopes may correspond to a respective predetermined observation window. While the plurality of envelopes would occur in different excitation frames, the plurality of envelopes are overlapped in the waveform diagram 700B to provide a visual comparison of the plurality of envelopes. In this example, the first envelope has the highest cumulative energy out of the plurality of envelopes. As a result, the first frequency may be selected by the measurement circuit 502 for generating excitation signals used in a touch detection operation.

As indicated above, FIG. 7B is provided as an example. Other examples may differ from what is described with regard to FIG. 7B. For example, a number of envelopes and frequency values may differ from what is described with regard to FIG. 7B.

The following provides an overview of some Aspects of the present disclosure:

Aspect 1: An ultrasonic touch sensor, comprising: a housing having an ultrasound chamber; a touch structure comprising a touch surface configured to receive a touch, wherein the touch structure is coupled to the housing and arranged over the ultrasound chamber; a signal generator configured to generate a first sequence of first excitation signals for producing a plurality of first ultrasonic transmit waves, wherein the signal generator is configured to generate the first sequence of first excitation signals by sweeping a first signal parameter in a first signal parameter range such that the first signal parameter is set to a first parameter value that is different for each first excitation signal; a transmitter arranged within the ultrasound chamber, wherein the transmitter is configured to receive the first sequence of first excitation signals and sequentially transmit the plurality of first ultrasonic transmit waves toward the touch structure based on the first sequence of first excitation signals, wherein each first ultrasonic transmit wave corresponds to a respective first excitation signal of the first sequence of first excitation signals; a receiver arranged within the ultrasound chamber, wherein the receiver is configured to receive a plurality of first ultrasonic reflected waves, wherein each first ultrasonic reflected wave is produced by a reflection of a respective first ultrasonic transmit wave of the plurality of first ultrasonic transmit waves, and wherein the receiver is configured to generate a plurality of first measurement signals representative of the plurality of first ultrasonic reflected waves, wherein each first measurement signal corresponds to a respective first ultrasonic reflected wave of the plurality of first ultrasonic reflected waves; and a measurement circuit coupled to the receiver and configured to determine a first cumulative signal energy for each first measurement signal, determine which first measurement signal out of the plurality of first measurement signals has a highest first cumulative signal energy, and configure, for a touch detection operation, the first signal parameter used by the signal generator with the first parameter value that corresponds to the first measurement signal having the highest first cumulative signal energy.

Aspect 2: The ultrasonic touch sensor of Aspect 1, wherein the measurement circuit is configured to measure, for each first measurement signal, the first cumulative signal energy in a respective observation window that corresponds to a reflection interface at which the plurality of first ultrasonic reflected waves are produced.

Aspect 3: The ultrasonic touch sensor of any of Aspects 1-2, wherein the measurement circuit is configured to generate an envelope for each first measurement signal, and calculate the first cumulative signal energy within a predetermined observation window for each envelope as the first cumulative signal energy for a respective first measurement signal.

Aspect 4: The ultrasonic touch sensor of any of Aspects 1-3, wherein the first cumulative signal energy is a cumulative amplitude calculated over a duration of a predetermined observation window that corresponds to a respective first ultrasonic reflected wave.

Aspect 5: The ultrasonic touch sensor of Aspect 4, wherein the measurement circuit is configured to calculate a cumulative peak summation as the cumulative amplitude.

Aspect 6: The ultrasonic touch sensor of Aspect 4, wherein the measurement circuit is configured to calculate the cumulative amplitude based on a Euclidean distance to a reference signal.

Aspect 7: The ultrasonic touch sensor of any of Aspects 1-6, wherein the measurement circuit is configured to generate an envelope for each first measurement signal, to generate a plurality of envelopes corresponding to the plurality of first measurement signals, calculate a cumulative amplitude for each envelope as the first cumulative signal energy for each first measurement signal, determine which envelope out of the plurality of envelopes has a highest cumulative amplitude as having the highest first cumulative signal energy, and configure, for the touch detection operation, the first signal parameter used by the signal generator with the first parameter value that corresponds to the first measurement signal having the highest cumulative amplitude.

Aspect 8: The ultrasonic touch sensor of any of Aspects 1-7, wherein the first signal parameter is a frequency of signal bursts.

Aspect 9: The ultrasonic touch sensor of Aspect 8, wherein the first signal parameter range is 1.0 to 3.5 MHz.

Aspect 10: The ultrasonic touch sensor of any of Aspects 1-9, wherein the first signal parameter is a number of signal pulses in a signal burst.

Aspect 11: The ultrasonic touch sensor of any of Aspects 1-10, wherein each first ultrasonic reflected wave is produced by a reflection of a respective first ultrasonic transmit wave at a same reflection interface of the touch structure.

Aspect 12: The ultrasonic touch sensor of any of Aspects 1-11, wherein the signal generator is configured to generate a second sequence of second excitation signals for producing a plurality of second ultrasonic transmit waves, wherein the signal generator is configured to generate the second sequence of second excitation signals by sweeping a second signal parameter in a second signal parameter range such that the second signal parameter is set to a second parameter value that is different for each second excitation signal, wherein the transmitter is configured to receive the second sequence of second excitation signals and sequentially transmit the plurality of second ultrasonic transmit waves toward the touch structure based on the second sequence of second excitation signals, wherein each second ultrasonic transmit wave corresponds to a respective second excitation signal of the second sequence of second excitation signals, wherein the receiver is configured to receive a plurality of second ultrasonic reflected waves, wherein each second ultrasonic reflected wave is produced by a reflection of a respective second ultrasonic transmit wave of the plurality of second ultrasonic transmit waves, and wherein the receiver is configured to generate a plurality of second measurement signals representative of the plurality of second ultrasonic reflected waves, wherein each second measurement signal corresponds to a respective second ultrasonic reflected wave of the plurality of second ultrasonic reflected waves, and wherein the measurement circuit is configured to determine a second cumulative signal energy for each second measurement signal, determine which second measurement signal out of the plurality of second measurement signals has a highest second cumulative signal energy, and configure, for the touch detection operation, the second signal parameter used by the signal generator with the second parameter value that corresponds to the second measurement signal having the highest second cumulative signal energy.

Aspect 13: The ultrasonic touch sensor of Aspect 12, wherein the signal generator is configured to generate the second sequence of second excitation signals following the first sequence of first excitation signals, and the signal generator is configured to set the first signal parameter of each second excitation signal to the first parameter value that corresponds to the first measurement signal having the highest first cumulative signal energy.

Aspect 14: The ultrasonic touch sensor of Aspect 12, wherein the first signal parameter is a frequency of signal bursts and the second signal parameter is a number of signal pulses in each signal burst.

Aspect 15: The ultrasonic touch sensor of any of Aspects 1-14, wherein, during the touch detection operation: the signal generator is configured to generate a second excitation signal for producing a second ultrasonic transmit wave, wherein the second excitation signal has the first parameter value that corresponds to the first measurement signal having the highest first cumulative signal energy, the transmitter is configured to receive the second excitation signal and transmit the second ultrasonic transmit wave toward the touch structure based on the second excitation signal, the receiver is configured to receive a second ultrasonic reflected wave produced by a reflection of the second ultrasonic transmit wave at the touch structure and generate a second measurement signal representative of the second ultrasonic reflected wave, and the measurement circuit is configured to perform a comparison based on the second measurement signal and a threshold, and determine whether a no-touch event or a touch event has occurred at the touch surface based on whether the second measurement signal satisfies the threshold.

Aspect 16: An ultrasonic touch sensor, comprising: a housing having an ultrasound chamber; a touch structure comprising a touch surface configured to receive a touch, wherein the touch structure is coupled to the housing and arranged over the ultrasound chamber; a signal generator configured to generate a sequence of excitation signals for producing a plurality of ultrasonic transmit waves, wherein the signal generator is configured to generate the sequence of excitation signals by varying a first signal parameter according to a plurality of first parameter values and varying a second signal parameter according to a plurality of second parameter values such that each excitation signal is different based on different combinations of a first parameter value of the plurality of first parameter values and a second parameter value of the plurality of second parameter values; a transmitter arranged within the ultrasound chamber, wherein the transmitter is configured to receive the sequence of excitation signals and sequentially transmit the plurality of ultrasonic transmit waves toward the touch structure based on the sequence of excitation signals, wherein each ultrasonic transmit wave corresponds to a respective excitation signal of the sequence of excitation signals; a receiver arranged within the ultrasound chamber, wherein the receiver is configured to receive a plurality of ultrasonic reflected waves, wherein each ultrasonic reflected wave is produced by a reflection of a respective ultrasonic transmit wave of the plurality of ultrasonic transmit waves, and wherein the receiver is configured to generate a plurality of measurement signals representative of the plurality of ultrasonic reflected waves, wherein each measurement signal corresponds to a respective ultrasonic reflected wave of the plurality of ultrasonic reflected waves; and a measurement circuit coupled to the receiver and configured to determine a cumulative signal energy for each measurement signal, determine which measurement signal out of the plurality of measurement signals has a highest cumulative signal energy, and configure, for a touch detection operation, the first signal parameter and the second signal parameter used by the signal generator with the first parameter value and the second parameter value that correspond to the measurement signal having the highest cumulative signal energy.

Aspect 17: The ultrasonic touch sensor of Aspect 16, wherein the measurement circuit is configured to generate an envelope for each measurement signal, and calculate the cumulative signal energy within predetermined observation window for each envelope as the cumulative signal energy for a respective measurement signal.

Aspect 18: The ultrasonic touch sensor of any of Aspects 16-17, wherein the cumulative signal energy is a cumulative amplitude calculated over a duration of a predetermined observation window that corresponds to a respective first ultrasonic reflected wave.

Aspect 19: The ultrasonic touch sensor of any of Aspects 16-18, wherein the first signal parameter is a frequency of signal bursts and the second signal parameter is a number of signal pulses in each signal burst.

Aspect 20: A method for calibrating an ultrasonic touch sensor, the method comprising: generating a sequence of excitation signals, including sweeping a signal parameter such that the signal parameter is set to a parameter value that is different for each excitation signal; sequentially transmitting a plurality of ultrasonic transmit waves based on the sequence of excitation signals, wherein each ultrasonic transmit wave corresponds to a respective excitation signal of the sequence of excitation signals; receiving a plurality of ultrasonic reflected waves, wherein each ultrasonic reflected wave is produced by a reflection of a respective ultrasonic transmit wave of the plurality of ultrasonic transmit waves; generating a plurality of measurement signals representative of the plurality of ultrasonic reflected waves, wherein each measurement signal corresponds to a respective ultrasonic reflected wave of the plurality of ultrasonic reflected waves; determining a cumulative signal energy for each measurement signal; determining which measurement signal out of the plurality of measurement signals has a highest cumulative signal energy; and configuring, for a touch detection operation, the signal parameter with the parameter value that corresponds to the measurement signal having the highest cumulative signal energy.

Aspect 21: The method of Aspect 20, further comprising: generating an envelope for each measurement signal; and calculating the cumulative signal energy within a predetermined observation window for each envelope as the cumulative signal energy for a respective measurement signal.

Aspect 22: A system configured to perform one or more operations recited in one or more of Aspects 1-21.

Aspect 23: An apparatus comprising means for performing one or more operations recited in one or more of Aspects 1-21.

Aspect 24: A non-transitory computer-readable medium storing a set of instructions, the set of instructions comprising one or more instructions that, when executed by a device, cause the device to perform one or more operations recited in one or more of Aspects 1-21.

Aspect 25: A computer program product comprising instructions or code for executing one or more operations recited in one or more of Aspects 1-21.

The foregoing disclosure provides illustration and description, but is not intended to be exhaustive or to limit the implementations to the precise form disclosed. Modifications and variations are possible in light of the above disclosure or may be acquired from practice of the implementations.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An ultrasonic touch sensor, comprising:
a housing having an ultrasound chamber;
a touch structure comprising a touch surface configured to receive a touch, wherein the touch structure is coupled to the housing and arranged over the ultrasound chamber;
a signal generator configured to generate a first sequence of first excitation signals for producing a plurality of first ultrasonic transmit waves, wherein the signal generator is configured to generate the first sequence of first excitation signals by sweeping a first signal parameter in a first signal parameter range such that the first signal parameter is set to a first parameter value that is different for each first excitation signal;
a transmitter circuit arranged within the ultrasound chamber, wherein the transmitter circuit is configured to receive the first sequence of first excitation signals and sequentially transmit the plurality of first ultrasonic transmit waves toward the touch structure based on the first sequence of first excitation signals, wherein each first ultrasonic transmit wave corresponds to a respective first excitation signal of the first sequence of first excitation signals;
a receiver circuit arranged within the ultrasound chamber, wherein the receiver circuit is configured to receive a plurality of first ultrasonic reflected waves, wherein each first ultrasonic reflected wave is produced by a reflection of a respective first ultrasonic transmit wave of the plurality of first ultrasonic transmit waves, and wherein the receiver circuit is configured to generate a plurality of first measurement signals representative of the plurality of first ultrasonic reflected waves, wherein each first measurement signal corresponds to a respective first ultrasonic reflected wave of the plurality of first ultrasonic reflected waves; and
a measurement circuit coupled to the receiver circuit and configured to determine a first cumulative signal energy for each first measurement signal, determine which first measurement signal out of the plurality of first measurement signals has a highest first cumulative signal energy, and configure, for a touch detection operation, the first signal parameter used by the signal generator with the first parameter value that corresponds to the first measurement signal having the highest first cumulative signal energy.

2. The ultrasonic touch sensor of claim 1, wherein the measurement circuit is configured to measure, for each first measurement signal, the first cumulative signal energy in a respective observation window that corresponds to a reflection interface at which the plurality of first ultrasonic reflected waves are produced.

3. The ultrasonic touch sensor of claim 1, wherein the measurement circuit is configured to generate an envelope for each first measurement signal, and calculate the first cumulative signal energy within a predetermined observation window for each envelope as the first cumulative signal energy for a respective first measurement signal.

4. The ultrasonic touch sensor of claim 1, wherein the first cumulative signal energy is a cumulative amplitude calculated over a duration of a predetermined observation window that corresponds to a respective first ultrasonic reflected wave.

5. The ultrasonic touch sensor of claim 4, wherein the measurement circuit is configured to calculate a cumulative peak summation as the cumulative amplitude.

6. The ultrasonic touch sensor of claim 4, wherein the measurement circuit is configured to calculate the cumulative amplitude based on a Euclidean distance to a reference signal.

7. The ultrasonic touch sensor of claim 1, wherein the measurement circuit is configured to generate an envelope for each first measurement signal, to generate a plurality of envelopes corresponding to the plurality of first measurement signals, calculate a cumulative amplitude for each envelope as the first cumulative signal energy for each first measurement signal, determine which envelope out of the plurality of envelopes has a highest cumulative amplitude as having the highest first cumulative signal energy, and configure, for the touch detection operation, the first signal parameter used by the signal generator with the first parameter value that corresponds to the first measurement signal having the highest cumulative amplitude.

8. The ultrasonic touch sensor of claim 1, wherein the first signal parameter is a frequency of signal bursts.

9. The ultrasonic touch sensor of claim 8, wherein the first signal parameter range is 1.0 to 3.5 MHz.

10. The ultrasonic touch sensor of claim 1, wherein the first signal parameter is a number of signal pulses in a signal burst.

11. The ultrasonic touch sensor of claim 1, wherein each first ultrasonic reflected wave is produced by a reflection of a respective first ultrasonic transmit wave at a same reflection interface of the touch structure.

12. The ultrasonic touch sensor of claim 1, wherein the signal generator is configured to generate a second sequence of second excitation signals for producing a plurality of second ultrasonic transmit waves, wherein the signal generator is configured to generate the second sequence of second excitation signals by sweeping a second signal parameter in a second signal parameter range such that the second signal parameter is set to a second parameter value that is different for each second excitation signal,
wherein the transmitter circuit is configured to receive the second sequence of second excitation signals and sequentially transmit the plurality of second ultrasonic transmit waves toward the touch structure based on the second sequence of second excitation signals, wherein each second ultrasonic transmit wave corresponds to a respective second excitation signal of the second sequence of second excitation signals,
wherein the receiver circuit is configured to receive a plurality of second ultrasonic reflected waves, wherein each second ultrasonic reflected wave is produced by a reflection of a respective second ultrasonic transmit wave of the plurality of second ultrasonic transmit waves, and wherein the receiver circuit is configured to generate a plurality of second measurement signals representative of the plurality of second ultrasonic reflected waves, wherein each second measurement signal corresponds to a respective second ultrasonic reflected wave of the plurality of second ultrasonic reflected waves, and
wherein the measurement circuit is configured to determine a second cumulative signal energy for each second measurement signal, determine which second measurement signal out of the plurality of second measurement signals has a highest second cumulative signal energy, and configure, for the touch detection operation, the second signal parameter used by the signal generator with the second parameter value that corresponds to the second measurement signal having the highest second cumulative signal energy.

13. The ultrasonic touch sensor of claim 12, wherein the signal generator is configured to generate the second sequence of second excitation signals following the first sequence of first excitation signals, and the signal generator is configured to set the first signal parameter of each second excitation signal to the first parameter value that corresponds to the first measurement signal having the highest first cumulative signal energy.

14. The ultrasonic touch sensor of claim 12, wherein the first signal parameter is a frequency of signal bursts and the second signal parameter is a number of signal pulses in each signal burst.

15. The ultrasonic touch sensor of claim 1, wherein, during the touch detection operation:
the signal generator is configured to generate a second excitation signal for producing a second ultrasonic transmit wave, wherein the second excitation signal has the first parameter value that corresponds to the first measurement signal having the highest first cumulative signal energy,
the transmitter circuit is configured to receive the second excitation signal and transmit the second ultrasonic transmit wave toward the touch structure based on the second excitation signal,
the receiver circuit is configured to receive a second ultrasonic reflected wave produced by a reflection of the second ultrasonic transmit wave at the touch structure and generate a second measurement signal representative of the second ultrasonic reflected wave, and
the measurement circuit is configured to perform a comparison based on the second measurement signal and a threshold, and determine whether a no-touch event or a touch event has occurred at the touch surface based on whether the second measurement signal satisfies the threshold.

16. An ultrasonic touch sensor, comprising:
a housing having an ultrasound chamber;
a touch structure comprising a touch surface configured to receive a touch, wherein the touch structure is coupled to the housing and arranged over the ultrasound chamber;
a signal generator configured to generate a sequence of excitation signals for producing a plurality of ultrasonic transmit waves, wherein the signal generator is configured to generate the sequence of excitation signals by varying a first signal parameter according to a plurality of first parameter values and varying a second signal parameter according to a plurality of second parameter values such that each excitation signal is different based on different combinations of a first parameter value of the plurality of first parameter values and a second parameter value of the plurality of second parameter values;
a transmitter circuit arranged within the ultrasound chamber, wherein the transmitter circuit is configured to receive the sequence of excitation signals and sequentially transmit the plurality of ultrasonic transmit waves toward the touch structure based on the sequence of excitation signals, wherein each ultrasonic transmit wave corresponds to a respective excitation signal of the sequence of excitation signals;
a receiver circuit arranged within the ultrasound chamber, wherein the receiver circuit is configured to receive a plurality of ultrasonic reflected waves, wherein each ultrasonic reflected wave is produced by a reflection of a respective ultrasonic transmit wave of the plurality of ultrasonic transmit waves, and wherein the receiver circuit is configured to generate a plurality of measurement signals representative of the plurality of ultrasonic reflected waves, wherein each measurement signal corresponds to a respective ultrasonic reflected wave of the plurality of ultrasonic reflected waves; and
a measurement circuit coupled to the receiver circuit and configured to determine a cumulative signal energy for each measurement signal, determine which measurement signal out of the plurality of measurement signals has a highest cumulative signal energy, and configure, for a touch detection operation, the first signal parameter and the second signal parameter used by the signal generator with the first parameter value and the second parameter value that correspond to the measurement signal having the highest cumulative signal energy.

17. The ultrasonic touch sensor of claim 16, wherein the measurement circuit is configured to generate an envelope for each measurement signal, and calculate the cumulative signal energy within predetermined observation window for each envelope as the cumulative signal energy for a respective measurement signal.

18. The ultrasonic touch sensor of claim 16, wherein the cumulative signal energy is a cumulative amplitude calculated over a duration of a predetermined observation window that corresponds to a respective first ultrasonic reflected wave.

19. The ultrasonic touch sensor of claim 16, wherein the first signal parameter is a frequency of signal bursts and the second signal parameter is a number of signal pulses in each signal burst.

20. A method for calibrating an ultrasonic touch sensor, the method comprising:
generating a sequence of excitation signals, including sweeping a signal parameter such that the signal parameter is set to a parameter value that is different for each excitation signal;
sequentially transmitting a plurality of ultrasonic transmit waves based on the sequence of excitation signals, wherein each ultrasonic transmit wave corresponds to a respective excitation signal of the sequence of excitation signals;
receiving a plurality of ultrasonic reflected waves, wherein each ultrasonic reflected wave is produced by a reflection of a respective ultrasonic transmit wave of the plurality of ultrasonic transmit waves;
generating a plurality of measurement signals representative of the plurality of ultrasonic reflected waves, wherein each measurement signal corresponds to a respective ultrasonic reflected wave of the plurality of ultrasonic reflected waves;
determining a cumulative signal energy for each measurement signal;
determining which measurement signal out of the plurality of measurement signals has a highest cumulative signal energy; and
configuring, for a touch detection operation, the signal parameter with the parameter value that corresponds to the measurement signal having the highest cumulative signal energy.

21. The method of claim 20, further comprising:
generating an envelope for each measurement signal; and calculating the cumulative signal energy within a predetermined observation window for each envelope as the cumulative signal energy for a respective measurement signal.

\* \* \* \* \*